Jan. 20, 1959 R. T. DRAKE 2,869,339
FLEXIBLE COUPLING AND METHOD OF MAKING SAME
Filed Dec. 7, 1956 2 Sheets-Sheet 1

INVENTOR.
BY ROBERT T. DRAKE
Eber J. Hyde
ATTORNEY

Jan. 20, 1959 R. T. DRAKE 2,869,339
FLEXIBLE COUPLING AND METHOD OF MAKING SAME
Filed Dec. 7, 1956 2 Sheets-Sheet 2

INVENTOR.
BY ROBERT T. DRAKE
ATTORNEY

United States Patent Office 2,869,339
Patented Jan. 20, 1959

2,869,339

FLEXIBLE COUPLING AND METHOD OF MAKING SAME

Robert T. Drake, Parma, Ohio, assignor, by mesne assignments, to Clevite Harris Products, Inc., Cleveland, Ohio, a corporation of Ohio Application December 7, 1956, Serial No. 626,877

5 Claims. (Cl. 64—11)

This invention pertains to a flexible coupling for transmitting a given amount of force from a first to a second movable member. The force to be transmitted may, for example, be a torsional force from one shaft to another, it may be a tensional force from one shaft to another, or it may be a shear force from one end plate to another.

An object of the invention is to provide a simple, inexpensive flexible coupling member for transmitting predetermined forces from a driving member to a driven member.

Another object of the invention is to provide a method of assembling a flexible coupling device.

For a better understanding of the present invention, together with other and further objects thereof, reference is had to the following description taken in connection with the accompanying drawings, and its scope will be pointed out in the appended claims.

An aspect of the present invention is the provision of a flexible coupling device comprised of two rigid hollow end fittings such as an end cap or a tube, and a solid or substantially solid bar of distortably resilient rubber-like material. Each end of the bar is forced into one of the end fittings, and the fittings then become connector means for securing the rubber-like bar in a force transmitting circuit.

The material of which the bar is made must be distortable and must have good resistance over a period of time against compression set. Compression set is the relaxation of the material's ability to return to its original shape. In addition to the above the material should be substantially incompressible, such as rubber.

The frictional forces exerted between the bar and the end fittings due to the distortion of the resilient material hold the assembly together without bonding, adhesives, pins or crimping of the metal parts, establishing a connection whose ability to transmit forces is known and which will not fail due to progressive deterioration of a bonded or adhesive joint. The force which the coupling is to transmit is known, and the size of the end fittings and the amount of distortion of the bar material during assembly are calculated so that when assembled the coupling member will not slip under rated service conditions.

Another aspect of the invention lies in the method of assembling a flexible coupling wherein a solid or substantially solid bar of rubber-like material is inserted into a hollow confining tube, and end fittings are inserted into both ends of the confining tube with the open ends of the fittings facing the solid rubber-like bar. Thereafter both fittings are forced toward each other to cause the ends of the bar to be severely distorted by reducing its diameter or cross-sectional area and to flow into the hollow end fittings. Thereafter the confining tube is removed.

With reference to the drawings there is shown in Figure 1 a sectional view of the flexible coupling device of this invention. Figure 1a is a fragmentary view of a modified end fitting for use with the assembly shown in Figure 1.

Figure 1:
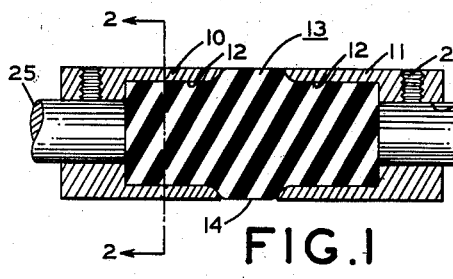
Figures 1A, 2:
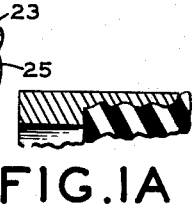
Figure 2 is a sectional view taken along line 2—2 of Figure 1.
Figure 2A:
Figure 2a is a sectional view similar to Figure 2 but showing a rubber bar and end fitting which are hexagonal in cross-section.

Figure 1 shows the flexible connector of the invention for transmitting a given amount of force. It is comprised of a first hollow end fitting 10 and a second hollow end fitting 11 each having a given internal diameter (ID) 12. The internal diameters of the two end fittings are the same, though this is not essential. The end fitting 10 shown in Figure 1 is substantially cup-shaped, having an open bottom or end wall, but other shapes may be used. For example the end fitting may be in the form of a closed end cup or it may be open like the tubular member shown in Figure 4. A solid or substantially solid bar of distorted, resilient, rubber-like material 13 has its two end portions forced into the two end fittings 10, 11, establishing a central portion 14 of the bar 13 which is free from contact with the end fittings and spacing the end fittings from each other. As is known to the art a lubricating material is used to facilitate insertion, and subsequently the lubricant is absorbed by the rubber to establish the required high frictional coefficient. As shown in Figure 2 the end fittings and the resilient bar 13 are round in cross-section, though other shapes may well be used. For example, Figure 2a illustrates a hexagonal end fitting around a hexagonal resilient bar of rubber-like material.

Figure 3A:
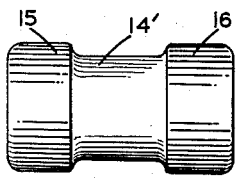
Figures 3a and 3b show modified rubber-like bar sections.
Figure 3:
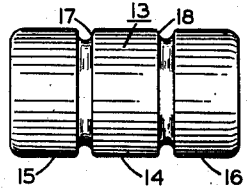
Figure 3 is a side view of a rubber-like bar used in the invention before it is assembled.

Figure 3 is a side view of the round solid bar 13 of resilient, rubber-like material prior to its being assembled with its end portions within the end fittings 10, 11. As shown, the bar in its undistorted condition comprises end portions 15, 16 and a central portion 14 separated from the end portions by grooves 17, 18.

In its assembled condition each of the end portions 15 and 16 is severely distorted by forcible insertion into an end fitting whose internal diameter 12 is substantially less than the normal, or undistorted, diameter (OD) of the bar of resilient material, and the volume of material in an end portion 15 is accurately calculated to completely fill its end fitting. Thus in its assembled condition shown in Figure 1, the end portions of the bar are continuously trying to expand radially outwardly against the internal diameter of the constraining end fittings 10, 11 thereby establishing high, permanent internal pressures. These pressures after absorption of the lubricant prevent the withdrawal of the resilient bar 13 from either of the end fittings and prevent slippage between the bar 13 and the end fittings due to torsional forces applied between the two end fittings when the device is in service. The diameter of the resilient bar 13 at the location of the bottom of a groove 17 or 18 is substantially equal to the internal diameter of the end fitting. Because of this relationship there are substantially no axially directed forces in the assembled device acting on the lip of the fitting tending to pop the bar out of its end fitting prior to complete absorption of the lubricant used during assembly.

Due to the resiliency of the rubber-like material 13 and to the spacing between the assembled end fittings 10 and 11 the coupling device has many modes of flexibility. It will yieldingly resist an axial pull of one fitting with respect to the other, and also will resist compressional forces along its axis. A torsional force will be resiliently transmitted between the two end fittings even though the axes of the two end fittings are misaligned or offset with respect to each other. To the trade these are known as angular and parallel misalignment. Also, as shown in Figure 4, the connector will transmit shear forces as from one end flange 20 to another end flange 21, and the flanges need not be exactly parallel.

Each of the end fittings 10, 11 may be provided with a set screw 22, and each has a bore 23 into which one end of a transmission shaft 25 is adapted to fit. Any other of the known means such as keyways and splines may be used for connecting the shaft to the fitting. The bore 23 and the shaft 25 may be other than round to accommodate torsional forces higher than can be resisted by the set screw alone.

Figure 3B:
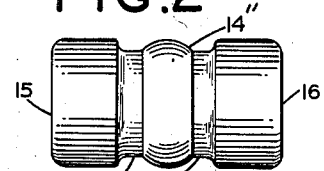

Figure 3a shows a bar-like section somewhat similar to that shown in Figure 3, but it differs in that it does not have a raised intermediate section between the grooves 17 and 18. Its end portions 15 and 16 may be identical to the end portions 15, 16 shown in Figure 3, but its center portion 14' has a diameter substantially equal to the internal diameter of the end fitting and consequently prevents the bar from popping out of the end fitting after assembly. Figure 3b shows another modified form of the bar prior to assembly. The end portions 15 and 16 are identical to the previously described device, but the intermediate portion 14" is set off by wire grooves 17', 18'. As previously described, the diameter of the bar at the location of the bottom of the grooves is substantially equal to the internal diameter of the end fittings, but intermediate the wide grooves 17', 18' the rubber-like material is of gradually increasing diameter.

Figure 4:
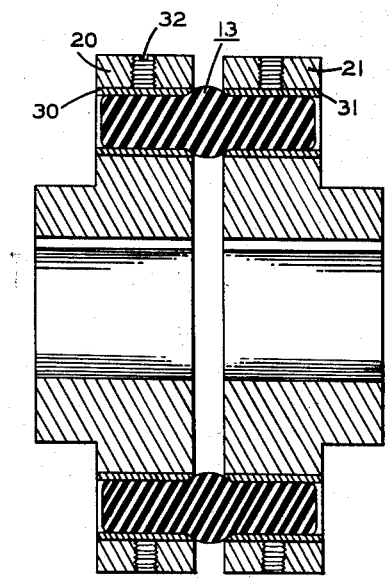
Figure 4 is a sectional view taken along line 4—4 of Figure 5.
Figure 5:
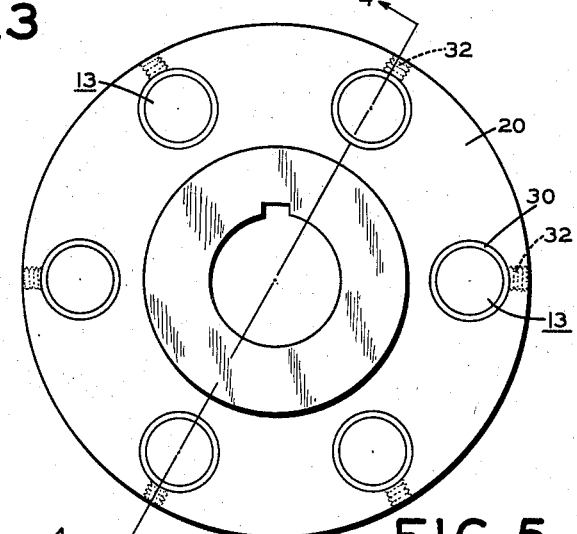
Figure 5 is an end view of the device of this invention utilized to couple together a driving and a driven flange.

Figure 4 shows a slightly modified flexible connector in that the end fittings 30, 31 do not include set screws, and the flanges 20, 21 are provided with set screws 32 for securing the connector to the flanges. The rubber-like member 13 is assembled into the end fittings 30, 31 as has previously been described. In the assembly shown in Figure 4 the rubber-like bar of Figure 3b was used, resulting in a gently bulged rubber-like cushion located between the flanges 20, 21. This cushion aids in smooth relative motion of the flanges if axial or parallel misalignment exists.

Figure 6:
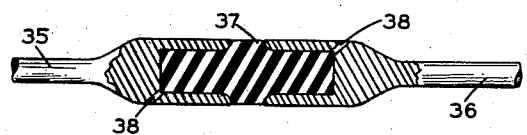
Figure 6 is a side view, partly broken away, showing a modified device embodying the invention.

In order to produce a flexible connector which is inexpensive it is essential that all excess parts and materials be eliminated. This has been done in the device of the present invention. In its simplest form shown in Figure 6 the end fittings are the ends of the rods in a force transmitting path, thereby eliminating separate end fittings and their set screws. As shown, force transmitting bars 35, 36 are coupled together by a rubber-like member 37 designed and assembled in accordance with the previous description, and vent holes 38 are provided in either rod to facilitate assembly. Either bar 35 or 36 may be the driven member and the other is the driving member.

Figure 7:
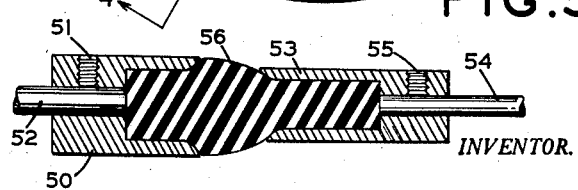
Figure 7 is a sectional view of a modified form of the invention wherein the device has a size reducing aspect.

It is not essential that both end fittings be of the same diameter. As shown in Figure 7 the device of this invention may be used to step-down or step-up the size of a force transmitting member, and will at the same time provide flexibility in the joint for all kinds of misalignment. As shown, a relatively large end fitting 50 is connected by set screw 51 to a force transmitting shaft 52 of relatively large size, and a relatively small end fitting 53 is connected to a relatively small, force transmitting shaft 54 by set screw 55. The rubber-like intermediate member 56 is designed and assembled into the end fittings in accordance with the aforesaid description. The area of the rubber-like member 56 in contact with the large diameter end fitting 50 should substantially equal the area of the rubber-like member 56 in contact with the small diameter end fitting 53. Thus where end fitting 53 is of smaller diameter the axial length over which contact is made must be increased in order to transmit the required forces without slippage.

In order for a flexible connector to be absolutely reliable in operation over a long period of time an adhesive alone cannot be used nor can bonding be used between the rubber-like bar and the end fittings, as it has been found that many adhesives and bonds are subject to progressive deterioration over a period of time. Also, if adhesives alone or bonding are used during assembly there is always a question as to whether or nor all connections are perfect since there is no accurate non-destructive way of testing the bonds. Though it is not essential, an adhesive may be used in conjunction with the aforedescribed invention, and a material may be used as a lubricant during assembly which subsequently becomes an adhesive to help hold the distorted rubber-like material within the end fittings.

The present device, consisting basically of three parts, is so designed and assembled that once it is put together there is 100 percent assurance that it will withstand the forces for which it was designed, and that there will be no progressive deterioration of the frictional forces holding the rubber-like material tightly against the end fittings.

Figure 8:
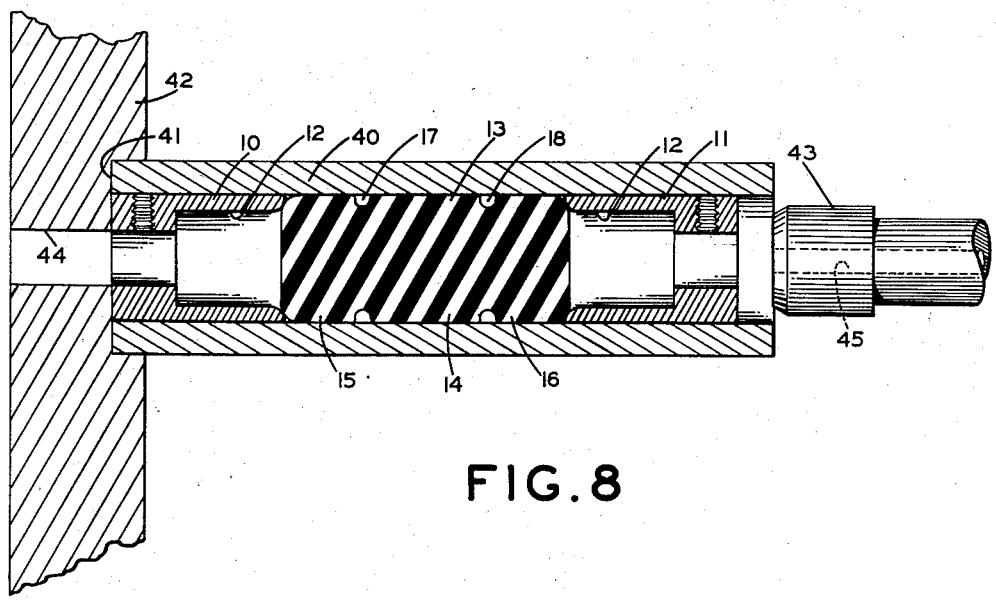
Figures 8 and 9 show steps in the method of assembling the flexible connector.
Figure 9:
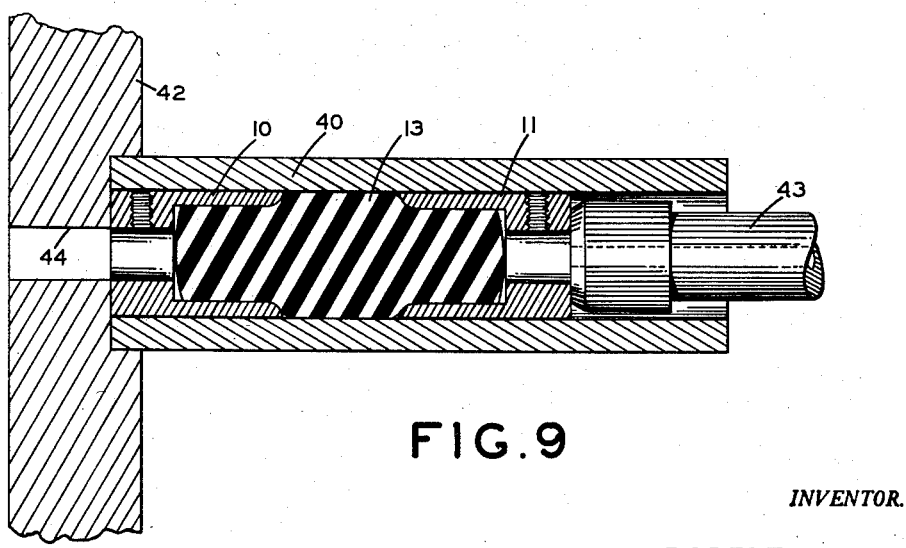

Figures 8 and 9 illustrate the method of assembling the flexible connector. A hollow confining tube 40 is provided, and the lubricated bar of rubber-like material 13 is inserted therein. The two end fittings 10 and 11 are inserted within the opposite ends of the confining tube 40 with the open ends of the fittings facing the bar 13. One end of the confining tube 40 is held against a restraining member 42 and a ram 43 forcefully pushes against one of the end fittings 11 forcing it against the rubber-like bar 13 and forcing the bar 13 against the lips of the other fitting 10. End fitting 10 is backed up by the restraining member 42. Continued forceful movement of ram 43, such as by a powerful hydraulic actuator, causes the ends 15 and 16 of the bar to severely distort and to flow, respectively, into the open ends of fittings 10 and 11. The ram 43 operates until all of the material in the end portions 15 and 16 is within the fittings, and the lips of the fittings 10, 11 are adjacent the walls of the grooves 17, 18 respectively. The air within the end caps is vented to the outside, hole 44 being provided through the restraining member 42, and a bore 45 being provided through the ram 43 for this purpose, or other suitable venting means may be used. Thereafter the confining tube 40 is removed, the grooves 17 and 18 preventing the ends from popping out of the fittings 10 and 11 as has been explained. The lubricant subsequently is absorbed into the rubber-like material establishing a very high coefficient of friction between the severely distorted bar and its end fittings. This very high coefficient of friction may be the primary means for holding the rubber-like material within the fitting, the secondary means, if used, being the aforedescribed adhesive. If increased surface area is needed to increase the amount of force which can be transmitted, the inner walls of the end fitting may be corrugated as shown in Figure 1a.

Throughout this description the rubber-like material has been described as solid or substantially solid. It is not essential to this invention that the portion of the rubber-like material inserted into an end fitting be absolutely solid. However, after deformation and insertion into the rigid, confining fitting the rubber-like material must have the ability to want to try to expand against the inner wall of the fitting. If there is a hole or bore through the rubber-like material which reduces this ability substantially then the rubber-like bar is not substantially solid within the meaning of the term as herein used.

When designing a flexible connector of this invention the engineer knows the magnitude and type of force to be transmitted and he knows the coefficient of friction between his distortable material and the material of the fitting. He computes the needed area of rubberlike material in contact with the internal surface of the fitting to transmit that force and he computes the volume of the end portion 15 of the distortable material which must be forced into the volume defined by the fitting in order to set up the required frictional forces. Thereafter, so long as the assembly process drives the designed amount of rubber-like material into the fitting the joint will be perfect.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a flexible coupling for transmitting a given amount of force, a first and a second hollow end fitting each having a given internal diameter; a substantially solid bar of distortable, resilient, rubber-like material having a first and a second end portion, the OD of the first end of said bar in its undistorted condition being greater than the ID of said first hollow fitting, and the OD of the second end of said bar in its undistorted condition being greater than the ID of said second hollow end fitting; the first and second end portions of said resilient, rubber-like bar being forced, respectively, into said first and second hollow end fittings for assembling the end fittings thereon and establishing a central portion of said substantially solid resilient bar free from contact with either of said end fittings, the first and second end portions of said resilient bar being severely distorted in their assembled condition, the amount of distortion of said substantially solid rubber-like material and its resiliency being such that its tendency to expand from its distorted condition establishes high frictional forces between its OD and the ID of the said end fittings sufficient to hold said distorted end portions fixed with respect to said end fittings as said coupling device transmits said given forces from one end fitting to the other.

2. In a flexible coupling for transmitting a given amount of force, a first and a second hollow end fitting each having a given internal diameter; a substantially solid bar of distortable, resilient, rubber-like material in its undistorted state having a circumferential groove extending around it spaced inward from each end thereof establishing two spaced-apart end portions and a central portion, the OD of said end portions in their undistorted state being greater than the ID of said hollow end fittings; the first and second end portions of said resilient, rubber-like bar being forced, respectively, into said first and second hollow end fittings for assembling the end fittings thereon and establishing said central portion free from contact with either of said end fittings, the first and second end portions of said resilient bar being severely distorted in their assembled condition, the amount of said distortion and the resilience of said rubber-like material being such that the tendency of the end portions to expand establishes high frictional forces between the outer surface of the end portions of said bar and the inner surface of the end fittings sufficient without other holding means to hold said distorted end portions of said bar fixed with respect to said end fittings as said coupling device transmits said given forces from one end fitting to the other.

3. A flexible coupling as set forth in claim 2, further characterized by the diameter of said bar of material in its undistorted state taken at the location of the bottom of said circumferential groove being substantially equal to the internal diameter of said hollow end fitting.

4. A flexible coupling as set forth in claim 3, further characterized by the volume of material in an end portion of said resilient bar of material being substantially equal to the volume of one of said hollow end fittings.

5. A flexible coupling as set forth in claim 4, further characterized by the inner surface of said hollow end fitting being corrugated to increase the area in contact with said resilient bar thereby to correspondingly increase the force which may be transmitted from one to the other member without slippage over the force which may be transmitted without slippage by an end fitting which is not corrugated.

References Cited in the file of this patent

UNITED STATES PATENTS

| | | |
|---|---|---|
| 1,940,885 | Rosenberg | Dec. 26, 1933 |
| 2,080,627 | Morgan | May 18, 1937 |
| 2,166,376 | Saurer | June 18, 1939 |
| 2,639,496 | Hartzell | May 26, 1953 |